United States Patent [19]

Le Forestier

[11] 4,426,058
[45] Jan. 17, 1984

[54] PNEUMATIC SUSPENSION FOR VEHICLE SEAT

[76] Inventor: René P. Le Forestier, 56480 Ruéo en Cléguerec, France

[21] Appl. No.: 234,596

[22] Filed: Feb. 17, 1981

[30] Foreign Application Priority Data

Feb. 21, 1980 [FR] France ................... 80 04121

[51] Int. Cl.³ ........................................... F16M 13/00
[52] U.S. Cl. ..................................... 248/594; 248/556
[58] Field of Search ............... 248/562, 566, 573, 621, 248/622, 631, 632, 594, 596

[56] References Cited

U.S. PATENT DOCUMENTS

| 576,419 | 2/1897 | Wilmot | 248/631 |
|---|---|---|---|
| 1,529,138 | 3/1925 | Kuentzel | 248/631 |
| 2,787,315 | 4/1957 | Siebert | 248/632 |
| 2,913,038 | 11/1959 | McDerby | 248/573 |
| 3,351,027 | 11/1907 | Ellard, Jr. et al. | 248/631 |
| 3,770,235 | 11/1973 | Klapproth et al. | 248/632 |
| 3,915,421 | 10/1975 | Le Forestier | 248/631 |
| 3,957,304 | 5/1976 | Koutsky | 248/573 |
| 4,168,819 | 9/1979 | Ducrocq | 248/631 |

FOREIGN PATENT DOCUMENTS 137831 6/1934 Austria ........................... 248/631

Primary Examiner—Gary L. Smith
Assistant Examiner—Michael F. Trettel
Attorney, Agent, or Firm—Laff, Whitesel, Conte & Saret

[57] ABSTRACT

A pneumatic suspension, especially for the seat of a vehicle.

The pneumatic suspension comprises a first horizontal plate (3) meant to support the load of the suspension, and a second horizontal plate (13) affixed to chassis (14) of the suspension, with one or several first pneumatic enclosures (19) wedged between the first and the second plates.

The first plate (3) is connected to the second plate (13) by means of lateral arms (9 and 10) the ends of which are fitted with rods (7, 8) capable of rotating in bearings 35, 36 and 5, 6) respectively affixed to the rear of the second plate and to the front of the first plate. The front of the first plate (3) is, in addition, connected to the front of the second plate (13) by one or several silent-blocks (25). The lateral arms may comprise each two rigid parts connected by silent-blocks (26).

Usable, especially, for seats of tractors, or trucks.

12 Claims, 5 Drawing Figures

PNEUMATIC SUSPENSION FOR VEHICLE SEAT

The present invention relates to a pneumatic suspension and, more especially, to a suspension for a seat of an automotive vehicle or of an air vehicle.

The improvement of the suspension devices for seats of vehicles subjected to strong vibration or to repeated shocks, such as trucks, agricultural tractors, construction equipement, military vehicles tanks, etc., and, in the air field, helicopters, has become an urgent need from the standpoint of the health of the drivers of those vehicles as well as of their comfort.

In French Patent No. 2 116 764, a pneumatic suspension device is described of two enclosures capable of being inflated, one of which serves as the seat, and the other serves as an air regulator, the two enclosures communicating with each other. It should be noted that this suspension is an appreciable improvement, relative to other well known suspensions.

In French Patent No. 2 224 678, there is described a pneumatic suspension comprising a first horizontal plate, meant to support the load of the suspension, a second horizontal plate, located below the first one and carried by it by means of cross-pieces, a third intermediary plate located between the first and the second plates, and affixed to the chassis of the suspension. A first plurality of first pneumatic enclosures is wedged between the first and the third plate. A second plurality of second pneumatic enclosures is wedged between the third and the second plates. Each first enclosure is connected with one or with several second enclosures by means of one or several ducts. The section of the ducts is adjustable by means of a suitable constriction device. The constriction device may present to the gaseous fluid—air generally—which maintains the pneumatic enclosures inflated, a flow section more important when the fluid moves downward than when it moves upward. This suspension makes it possible to cause variations in the response to the vibrations applied to the suspension, by making it possible to cause variations in the elasticity parameter through adjustment of the pressure inside the enclosures, and to adjust its damping action through an action on the constriction device. Tests carried out with that suspension have shown that it is possible definitely to improve the response of the suspension to frequencies which prove especially harmful to the comfort of the operators using the seat.

Although the results obtained with the above-indicated pneumatic suspensions are clearly better than with other well known suspensions, they require a lateral and a longitudinal stabilizing of the part of the seat which rests on the inflated enclosures, otherwise the seated person constantly is seeking his or her balance. That type of phenomenon is encountered on pivoting seats mounted on rollers. It has been recognized that such search for balance has harmful consequences for certain parts of the human spine.

One object of the present invention consists of providing a pneumatic suspension in which it is possible to find all of the advantages of the suspensions described in the aforenoted patent Nos. 2 116 764 and 2 224 678, but which, in addition, is definitely improved with respect to the lateral and longitudinal stability.

According to a characteristic of the present invention, there is provided a pneumatic suspension comprised of a first horizontal plate meant to support the load of the suspension, and a second horizontal plate affixed to the chassis of the suspension, with one or several first pneumatic enclosures wedged between the first and the second plate. The first plate is connected to the second plate by means of two lateral arms the ends of which are fitted with rods capable of rotating in bearings respectively affixed to the rear of the second plate and to the front of the first plate, the front of the first plate being, in addition, connected to the front of the second plate by means of one or of several solid resilient silent-blocks.

According to another characteristic of the invention, the lateral arms each are comprised of two rigid portion conected by solid resilient silent-blocks.

According to another characteristic of the invention, the first enclosures are of the type of pneumatics used in wheels of vehicles, and structures are mounted on the second plate to limit their displacement in the horizontal direction.

According to another characteristic of the invention, the rear of the first plate and the rear of the second plate have their spacing upward limited by suitable means such as belts.

According to another characteristic of the invention, the rear of the first plate and the rear of the second plate have their vertical adjacency limited by means of lug pieces.

The above-indicated characteristics of the invention, as well as others, will appear more clearly upon reading of the following description of embodiments, said description being given with reference to the attached drawing in which.

Figure 1:
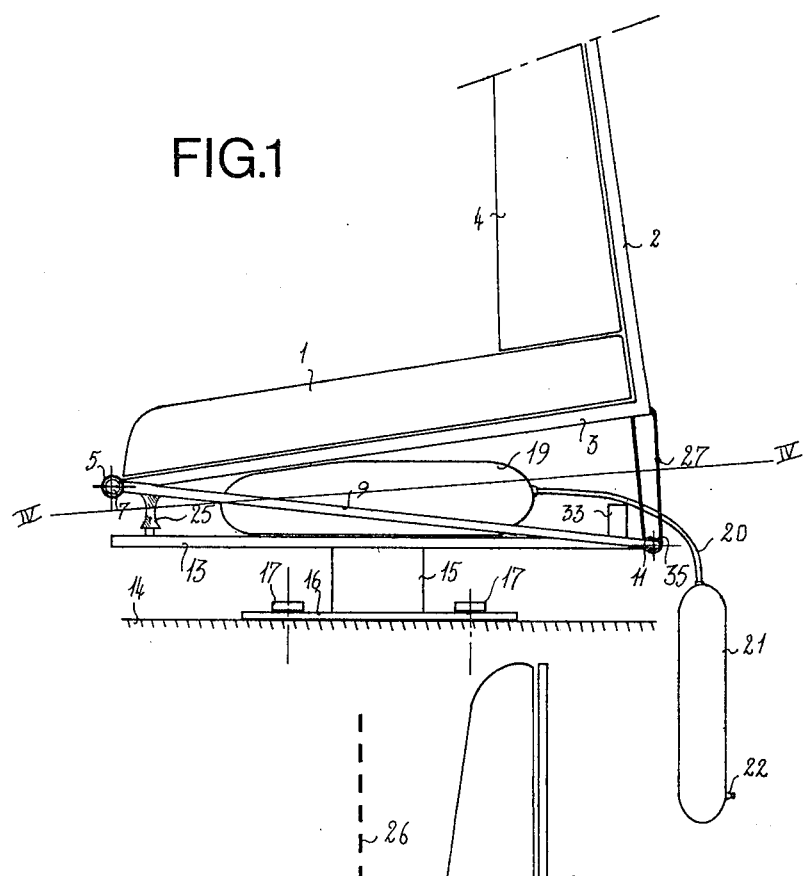
FIG. 1 is a schematic side view of a suspension, according to the invention, in its rest position, without any load.

The suspension in FIG. 1 supports a seat formed of a cushion 1, of a back 2, connected to a horizontal plate 3 and which supports a back cushion in the conventional manner. Arm rests, not shown, connected to plate 3, may possibly be provided for. On both sides of the front part of the plate 3 are provided bearings 5 and 6 inside which rods 7 and 8, can rotate respectively set at the front end of two arms 9 and 10. The plane of arms 9 and 10 normally makes a sharp angle of the order of some 10 degrees with that of plate 3, and it goes downward toward the rear of the suspension. The rear ends of the arms 9 and 10 are respectively fitted with short rods 11 and 12 capable of rotating in bearings 35 and 36 connected to the rear part of a plate 13 which is connected to the chassis 14. As an example, plate 13 is soldered to a piece of vertical cylindrical tubing 15, which is itself soldered or welded to a plate 16 affixed to chassis 14 by means of screws 17. In the embodiment which is being described, bearings 5 and 6 for one part, and 35 and 36 for the other part, are the ends of tubes one of which is welded to the front of plate 3 and the other to the rear of plate 13.

Plate 13 is horizontal, arms 9 and 10 are set slightly from rods 11 and 12, toward rods 7 and 8, so that, seen from the side, the complex formed by plate 3, the pair of arms 9 and 10 and plate 13 presents the shape of a very flattened z.

Figure 2:
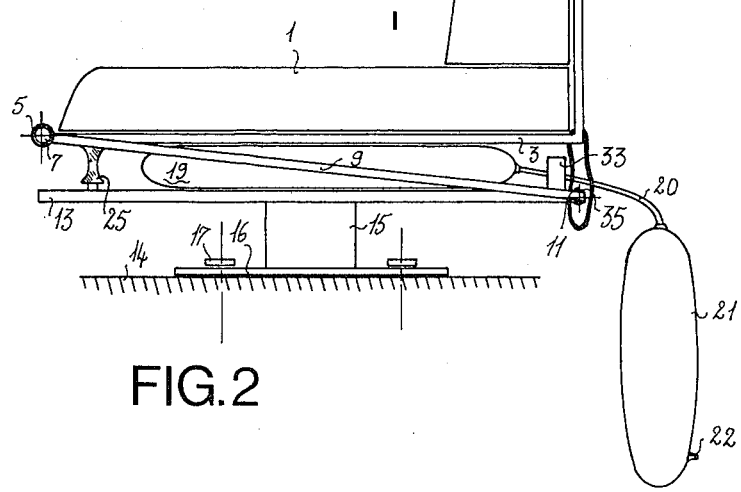
FIG. 2 is a schematic side view of the suspension in FIG. 1, with a load.

Around the center of plate 13, on its upper face, there is set a vertical cylinder 18, relatively short in height. Around cylinder 18 there is placed a pneumatic enclosure 19 of the inner tube type with a small diameter, the inside of which communicates, through a duct 20, with another pneumatic enclosure 21, located in a free space so that it does not undergo any strong mechanical stresses. Enclosure 21 also may be an inner tube. Enclosure 21, at least, is fitted with a valve 22 which makes it possible to put the air filling 19, 20 and 21 under a preset pressure, of the order of 50 g/cm², for example. As seen in FIG. 2, when cushion 1 and therefore plate 3 are loaded, chamber 19 is compressed between plates 3 and 13. Cylinder 18 has as its object to hold chamber 19 at the center of plate 13, preventing it from moving toward the rear especially. Inside the section of cylinder 18, plate 13 is pierced with holes 23 which make it possible for the air imprisoned between plate 3, the ring of tube 19 and plate 13, to escape freely. In the same manner, under cushion 1, facing holes 23, it is possible for the same reason, to provide for one or several holes 24 in plate 3.

Finally, between the front zone of plate 3 and the front zone of plate 13, are connected solid resilient silent-blocks 25 the ends of which are screwed in plate 3 and in plate 13.

When the positions of the suspension without load in FIG. 1 and with a load, FIG. 2, are compared it appears that plate 3 rotates around the axis defined by rods 7 and 8, and that the presence of the solid resilient silent-blocks 25 thus prevent any lateral or longitudinal displacement of plate 3. The rear zone of plate 3, facing dashed line 26, which represents the spine of the seated person, essentially rests on chamber 19 and benefits from all of the advantages of the suspensions described in French Patents mentioned above. Especially, it is possible to fit on duct 20 a constriction device, such as the one which has been described in French Patent No. 2 224 678.

It is particularly the rear zone of the seat which must be protected against shocks and vibrations. The front part of the seat on which there more or less rest, and often rather less than more, the internal faces of the knee articulations, is uncoupled from the chassis 14, by means of the solid resilient silent-blocks 25, and the front part of the chamber 19, this ensuring a good damping condition, but especially the presence of the solid resilient silent-blocks 25 and arms 9 and 10 ensure a good stability of the seat in the horizontal plane.

Figure 5:
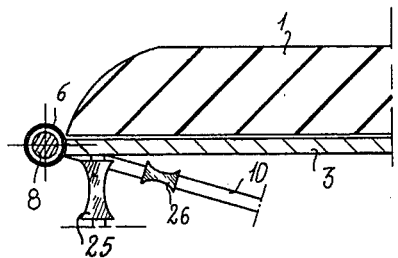
FIG. 5 is a vertical sectional view of a variation of a detail of the suspension in FIG. 1.
Figure 3:
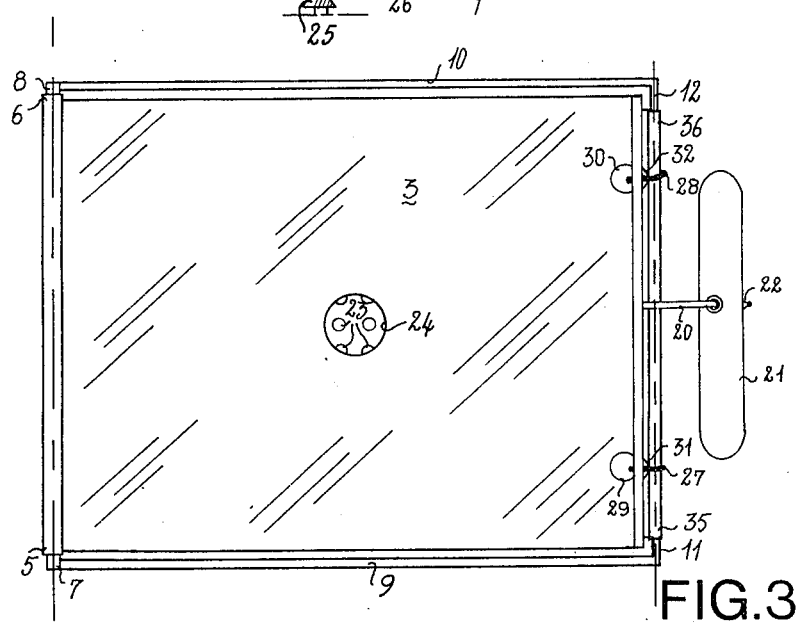
FIG. 3 is a top view of the suspension, with the cushion (padding of the seat) being removed.
Figure 4:
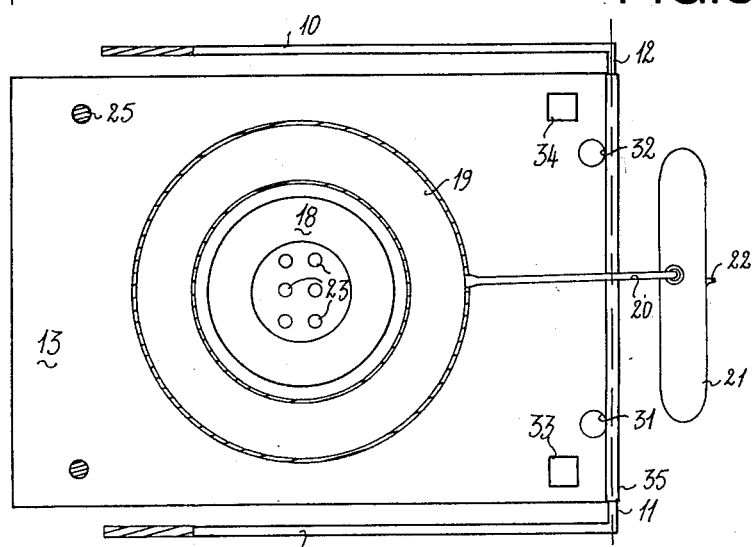
FIG. 4 is a horizontal sectional view of the suspension in FIG. 1, along line IV—IV.

As shown in the section in FIG. 5, arms 9 and 10 may also comprise longitudinal solid resilient silent-blocks 26, which strongly damp the vibrations which might be transmitted from chassis 14 to late 3, through arms 9 and 10.

Belts 27 and 28 which respectively run through holes 29 and 30 of plate 3 and 31 and 32 of plate 13, make it possible to prevent any tipping of the seat forward, when it is empty, as represented in FIG. 1, but also in case of sudden braking or of accident. On the other hand, when loaded, those belts 27 and 28 are loose and they create no coupling between 3 and 13.

Lug pieces 33 and 34 are vertically placed at the rear of plate 13, to limit the downward displacement of the rear of plate 3, especially in the case of a pneumatic blow-out or of a leak in enclosure 19 or 21.

Chamber 21 can easily be lodged behind the seat or, for example, it may be hooked behind the back 2 of the seat.

Of course, even though in the above description there has been more especially considered a vehicle seat, it must be understood that the invention is not limited to that application and that it can also be used for other types of suspension.

I claim:

1. A pneumatic suspension system for a vehicle seat, said system comprising a first horizontal plate for supporting the weight of a person sitting in said seat, and a second horizontal plate for attachment to a chassie formed by a structural member of said vehicle, at least one first pneumatic spring enclosure positioned between the first and the second plates thereby providing an air spring suspension, the first plate being connected to the second plate by two lateral arms, bearings affixed to the rear of the second plate and to the front of the first plate, rods formed at the ends of the arms for rotation in said bearings, the front part of the first plate being connected to the front of the second plate by means of at least one sway controlling solid resilient silent-block which is generally located under the knees of a person sitting in the seat, wherein there are two of said pneumatic enclosures communicatingly interconnected by a tube, the second of said enclosures being located in an unloaded area, whereby air in said first enclosure is displaced to said second enclosure responsive to the weight of a person sitting on said seat.

2. The suspension system of claim 1 and valve means in the pneumatic system for venting air therefrom if the air pressure exceeds a predetermined maximum.

3. A suspension according to claim 1, in which each lateral arm is comprised of two rigid portions connected by said at least one resilient silent-block.

4. A suspension according to claim 1, in which the first enclosure is formed by at least one tube which is a type of tube that is used as an inner tube for a vehicle wheel and further including means on said second plate for limiting its displacement in a horizontal plane.

5. A suspension according to claim 1, further including means for limiting an upward spacing between the rear of the first plate and the rear of the second plate.

6. A suspension according to claim 1, further including means for limiting a vertical adjacency between the rear of the first plate and the rear of the second plate.

7. A suspension according to claim 1, in which the first enclosure is formed by at least one tube which is a type of tube that is used as an inner tube for a vehicle wheel, and further including means on said second plate for limiting a vertical spacing between the rear of the first plate and the rear of the second plate.

8. A suspension according to claim 2, in which each lateral arm is comprised of two rigid portions connected by said resilient silent-blocks.

9. A suspension according to claim 2, in which the first enclosure is formed by at least one tube which is a type of tube that is used as an inner tube for a vehicle wheel, and further including means on said second plate for limiting its displacement in a horizontal plane.

10. A suspension according to claim 2, further including means for limiting an upward spacing between the rear of the first plate and the rear of the second plate.

11. A suspension according to claim 1, in which the first enclosure is formed of at least one tube which is a type of tube that is used as an inner tube for a vehicle wheel, and further including means on said second plate for limiting its displacement in a horizontal plane, and means for limiting a vertical adjacency between the rear of the first plate and the rear of the second plate.

12. A suspension according to claim 1 in which the first enclosure is formed of at least one tube which is a type of tube that is used as an inner tube for a vehicle wheel, and further including means fitted on said second plate for limiting its displacement in a horizontal plane, and means for limiting the vertical spacing between the rear of the first plate and the rear of the second plate, and means for limiting a vertical adjacency between the rear of the first plate and the rear of the second plate.

* * * * *